United States Patent [19]

Kawasugi et al.

[11] Patent Number: 5,248,202
[45] Date of Patent: Sep. 28, 1993

[54] BEARING AND A TABLE FOR LINEAR SLIDING MOTION

[75] Inventors: Masashi Kawasugi, Onoda; Mitsuhiro Nobukuni, Shimonoseki, both of Japan

[73] Assignee: THK Co., Ltd., Tokyo, Japan

[21] Appl. No.: 828,958

[22] PCT Filed: May 30, 1991

[86] PCT No.: PCT/JP91/00729
§ 371 Date: Mar. 20, 1992
§ 102(e) Date: Mar. 20, 1992

[87] PCT Pub. No.: WO92/00462
PCT Pub. Date: Jan. 9, 1992

[30] Foreign Application Priority Data

Jun. 22, 1990 [JP] Japan ................. 2-162570

[51] Int. Cl.$^5$ ............................. F10C 29/06
[52] U.S. Cl. ...................................... 384/45
[58] Field of Search .................. 384/43–45; 464/168

[56] References Cited

U.S. PATENT DOCUMENTS 4,443,042 4/1984 Walter et al. ............... 384/43
4,799,803 1/1989 Tanaka ...................... 384/43

FOREIGN PATENT DOCUMENTS 59-28773 7/1984 Japan .
61-266823 11/1986 Japan .
2-57718 2/1990 Japan .

Primary Examiner—Thomas R. Hannon
Attorney, Agent, or Firm—Armstrong, Westerman, Hattori, McLeland & Naughton

[57] ABSTRACT

According to a bearing and a table for linear sliding motion according to the invention, a sliding table is formed of a plurality of divided blocks which are aligned in one row and have load rolling surfaces on which rolling members rolls. By arbitrarily choosing a number of the divided blocks, a number of the load rolling members can be facilely increased depending on a size of the table to be linearly guided. Therefore, waving of the slide members can be minimized, and linearity of the movement thereof can be improved.

3 Claims, 12 Drawing Sheets

BEARING AND A TABLE FOR LINEAR SLIDING MOTION

TECHNICAL FIELD

The present invention relates a bearing and a table for linear sliding motion for linearly guiding a movable object to be slid, for example, in a slide component for machine tools such N.C. machines or industrial robots.

BACKGROUND ART

A conventional bearing for linear sliding motion of a type described above generally has a construction shown in FIG. 17. Specifically, it is formed of a track bed (or track member) (b) having rolling surfaces (b1) on which rolling members (a) such as balls roll in an axial direction; a slide bed (or slide member) (c) having load rolling surfaces (c1), which cooperate with the rolling surfaces (b1) to hold the rolling members (a) therebetween, and no-load rolling apertures (c2) corresponding to the load rolling surfaces (c1); and covers (d) for coupling and connecting the load rolling surfaces (c1) and the no-load rolling apertures (c2) to form endless paths for the rolling members (a). In this construction, the rolling member (a) rolls through load regions between the rolling surfaces b1 of the track member (b) and the load rolling surfaces (c1) of the slide member (c), whereby the slide bed (c) can linearly move along the track member (b) with a remarkably small frictional resistance.

A table for linear sliding motion, which supports a machine tool or a work for guiding them, generally has a construction shown in FIGS. 18 and 19, in which a plurality of track members (b) (two in the Figure) used for the bearings for the linear sliding motion are disposed on a fixing portion (e), and a plurality of sliding members (c) (two in the Figure) for carrying a table (f) are assembled to each track bed with a space between one another.

However, such bearings for the linear sliding motion have following disadvantages with respect to the motion of the slide members due to its construction.

First, minute vibration called as "waving" is generated in the slide members. In the bearing for the linear sliding motion including the rolling members which circulate and perform an endless movement for the slide member, the rolling members are generally in preloaded conditions when they roll through a load region in order to increase rigidity of the slide member with respect to the track member and prevent rattling thereof. Therefore, when the rolling members are forcedly entered into the load region or released from the load region, the slide member minutely deviates in vertical or lateral directions, which causes the minute vibration, i.e., waving during the movement of the slide member.

A second disadvantage relates to a linearity of a motion of the slide member. It is ideal for the slide bed to move linearly with respect to the fixing portion on which the track member is disposed. However, the motion thereof is inevitably affected by a mounting accuracy of the track member to the fixing portion and a machining accuracy of the rolling surfaces, and thus it is very difficult in practice to obtain a high linearity of the movement. If it is attempted to obtain the desired linearity of the movement by increasing the mounting accuracy of the track member and the machining accuracy of the rolling surfaces, disadvantages such as high costs and low productive efficiency will be caused. Therefore, in view of the above, the linearity of the movement can be improved only to a restricted extent.

The disadvantages of the motion of the slide member described above form an important factor which cannot be overlooked in machine tools or the like which are guided by the bearings for the linear motion during machining operations, because the waving of the slide members or the insufficient linearity of the movement causes deviation of the tools of the machine tools, and thus directly affects the machining accuracy of the products.

However, in the recent industrial application, demands for higher accuracies in various products, and thus demands for higher machining accuracies have been increased in the machines and apparatuses such as machine tools for machining these products.

Accordingly, the bearings for the linear sliding motion for performing linear guiding in various machines and apparatuses have been required to prevent the waving during movement or travelling of the slide beds and to improve the linearity of the movement.

On the other hand, with respect to the tables for the linear sliding motion, reduction of costs has been attempted by minimizing thicknesses of tables which are mounted on the slide members in the recent years. However, this adversely affects the rigidity, and specifically, this may cause deflection or the like in the tables which may reduce the machining accuracies of machine tools mounted thereon.

In view of the above demands and problems, it is an object of the invention to provide a bearing for linear sliding motion, which can minimize the waving of the slide member and improve the linearity of the movement.

Another object of the invention is to provide a table for linear sliding motion which allows machining with a high accuracy by a machine or apparatus such as a machine tool mounted thereon.

DISCLOSURE OF THE INVENTION

The inventor of the invention and others have earnestly studied to achieve the objects described above, and found that, as a number of rolling members which roll through a load region increases, a waving value of a slide bed decreases and also a linearity of a movement is improved. Based on this, with respect to a table for linearly sliding motion, a slide member having a length which is increased to a maximum allowable extent and corresponds to a size of a table for linear sliding motion may be manufactured and attached to a lower surface of the table, whereby the table for the linear sliding motion can have the waving value and linearity for the movement which are improved as compared with the prior art.

However, since tables have various sizes depending on machines and apparatus mounted thereon, it is not preferable, in view of productive efficiency, to manufacture slide members of various sizes in accordance with user's orders.

In view of this, the inventors and others have further studied and devised the present invention.

A bearing for linear sliding motion of the invention comprises a track bed provided with rolling surfaces for rolling members such as balls or rollers extending in a lengthwise direction; a slide member formed of a plurality of divided blocks which are provided with load rolling surfaces cooperating with the rolling surfaces to hold the rolling members therebetween, said divided blocks being joined together to continuously connect the load rolling surfaces; and rolling member circulating means which connects opposite ends of the continuously connected load rolling surfaces to form an endless circulation path for the rolling members.

A table for linear sliding motion of the invention comprises a track member provided with rolling surfaces for rolling members such as balls or rollers extending in a lengthwise direction; a slide member formed of a plurality of divided blocks which are provided with load rolling surfaces cooperating with the rolling surfaces to hold the rolling members therebetween, said divided blocks being joined together to continuously connect the load rolling surfaces; rolling member circulating means which connects opposite ends of the continuously connected load rolling surfaces to form an endless circulation path for the rolling members; and table for mounting a movable member to be guided linearly, said table being fixed to the slide member for movement in a lengthwise direction of the track member.

According to the subject of the invention, in which the slide is formed of divided blocks having the load rolling surfaces and jointed together, a number of the divided blocks may be appropriately varied, and for example, may be determined in accordance with sizes of the table to be linearly guided.

Further, the divided blocks may be varied with respect to a configuration, a number of the load rolling surfaces and a contact angle of the rolling members and others depending on a practical application of the bearing, and slide member of a bearing for linear sliding motion may be utilized.

Although the load rolling surfaces of the divided blocks may be formed by individually applying grinding or the like to the respective blocks, it is preferable to simultaneously form the load rolling surfaces on the divided blocks, which are fixed to a jig for handling it as one component, in order to improve continuity of the load rolling surfaces of the slide member i.e., an assembly of the blocks.

Various variations such as use of ball tubes may be applied to a specific construction of the rolling member circulating means, which serves to scoop and return balls from one end of the continuously connected load rolling surfaces to the other end and cooperates with the load region to form an endless circulation path for the rolling members.

Further, the rolling members may be appropriately selected from cylindrical rollers, barrel rollers, balls and others.

Generally, so-called crowning may be applied to the load rolling surfaces of the slide member in order to achieve smooth circulation of the rolling members, and specifically, opposite side regions of the load rolling surfaces may be ground to a relatively large extent as compared with a middle region to form sections of the load rolling surfaces of the side regions into substantially convexly curved shapes. However, in the present invention, the construction requires to apply the crowning only to the load rolling surfaces of the divided blocks (hereinafter referred to "end blocks") located at opposite ends of the slide member. Therefore, a pair of end blocks to which the crowning is applied may be assembled together with an intended number of divided blocks (hereinafter referred to as "middle blocks") to which the crowning is not applied. This facilitates manufacturing of the slide member having a length corresponding to the number of the middle blocks.

According to the subject of the invention described above, by appropriately selecting the number of the divided blocks, the slide member can be facilely manufactured to have a long length corresponding to a movable member such as a table to be linearly guided, and the number of the load rolling members which rolls through the load region can be increased in accordance with the increase of the length of the slide member.

DESCRIPTION OF THE REFERENCE NUMERAL

1: track bed, 2: slide bed, 2a: end block (divided block), 2b: middle block (divided block), 3: cover (rolling member circulating means), 4: ball (rolling member), 11: rolling surface, 24: load rolling surface

DETAILED DESCRIPTION OF THE INVENTION

A bearing and a table for linear sliding motion of the invention will be described with reference to the accompanying drawings.

Figure 1:
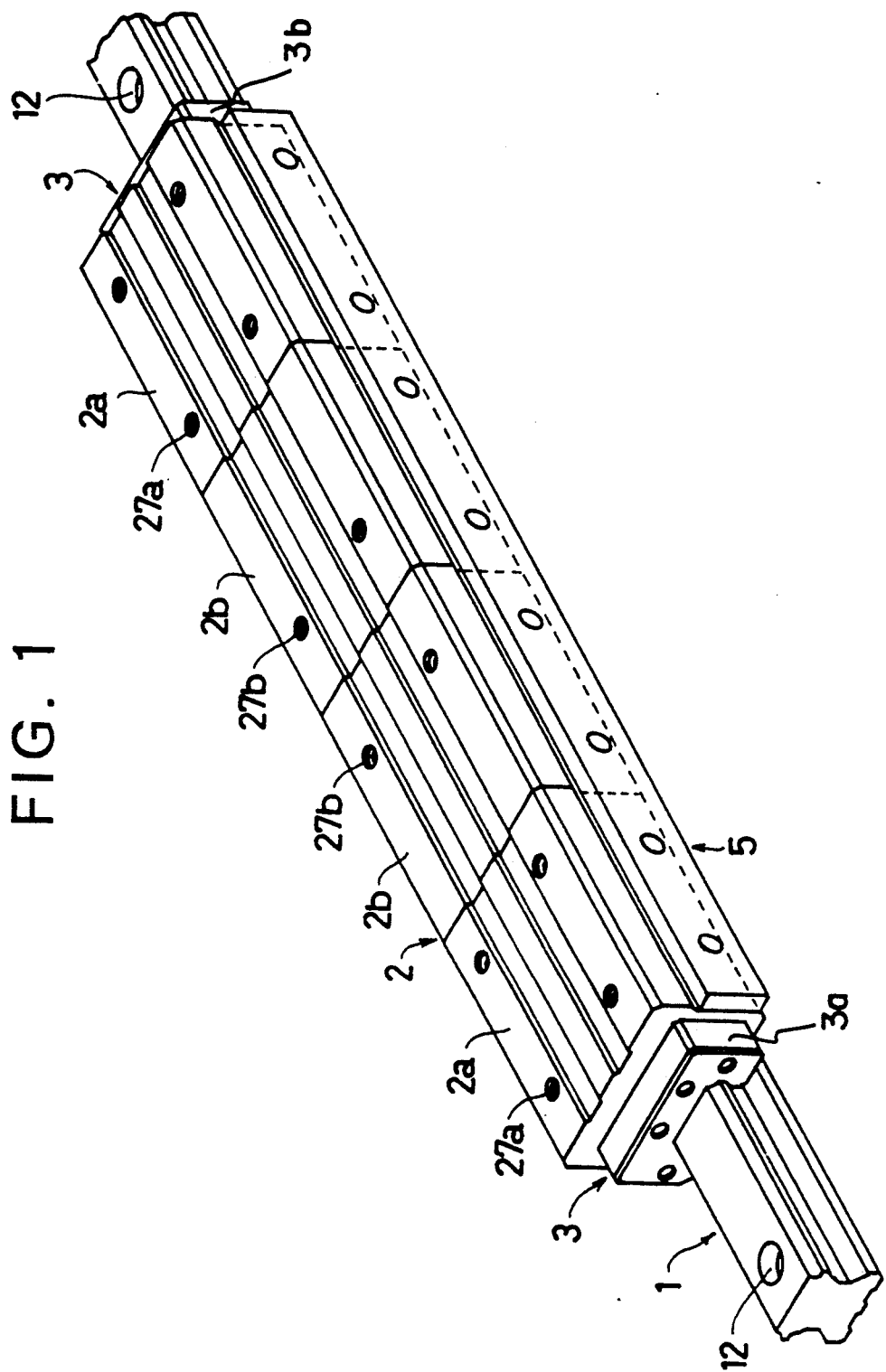
FIGS. 1 and 2 are a perspective view and a cross section illustrating a first embodiment of a bearing for linear sliding motion of the invention, respectively.
Figure 2:
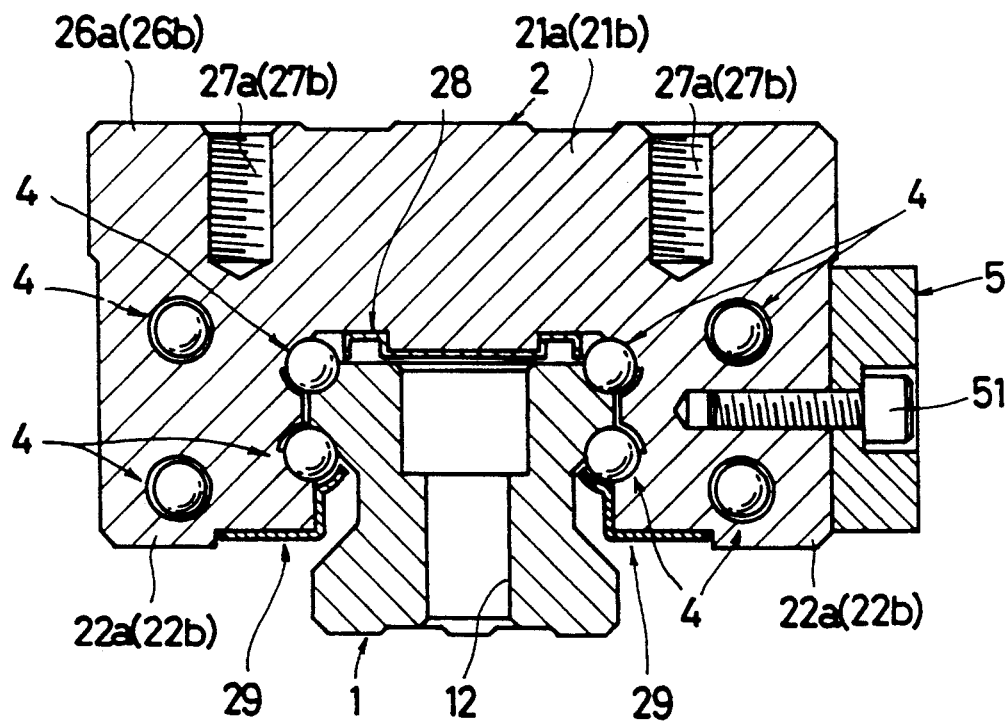

FIGS. 1 and 2 illustrate a first embodiment of the bearing for the linear sliding motion of the invention. The bearing is formed of a track member 1 mounted on a stationary or fixing portion, a slide bed 2 disposed over the track member 1, a pair of covers 3a and 3b (rolling member circulating means) attached to opposite ends of the slide member 2, and a large number of balls (rolling members) which bear a load between the track member 1 and the slide member 2.

Figure 3:
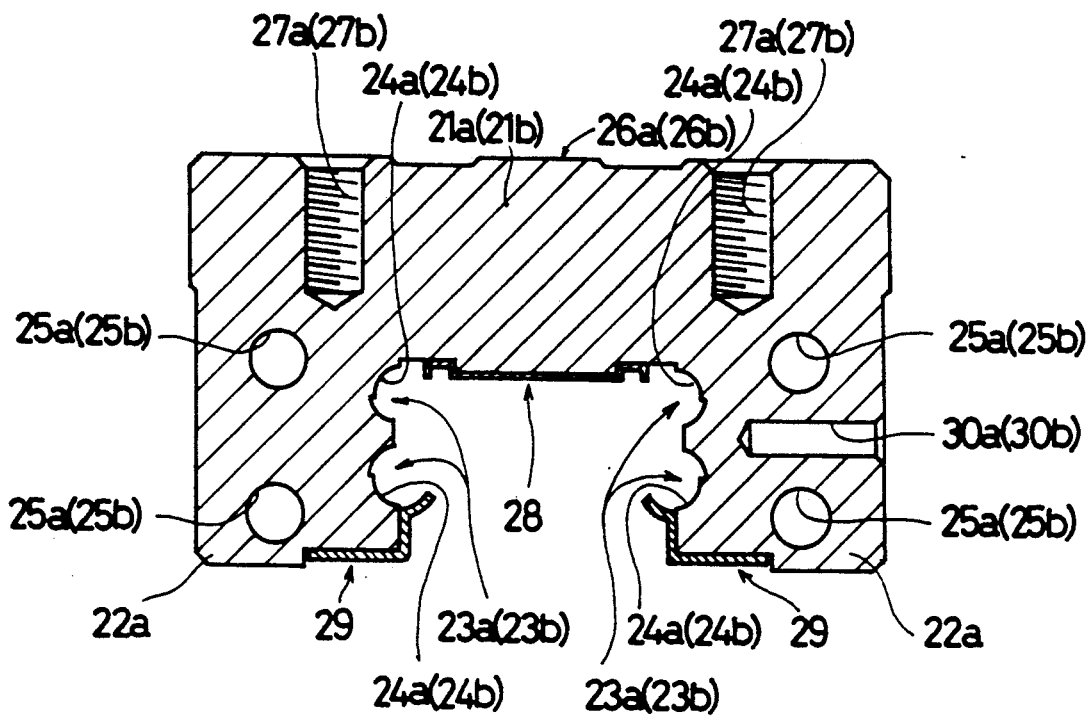
FIGS. 3 and 4 are a cross section and a side view illustrating an end block (middle block) according to a first embodiment, respectively.
Figure 4:
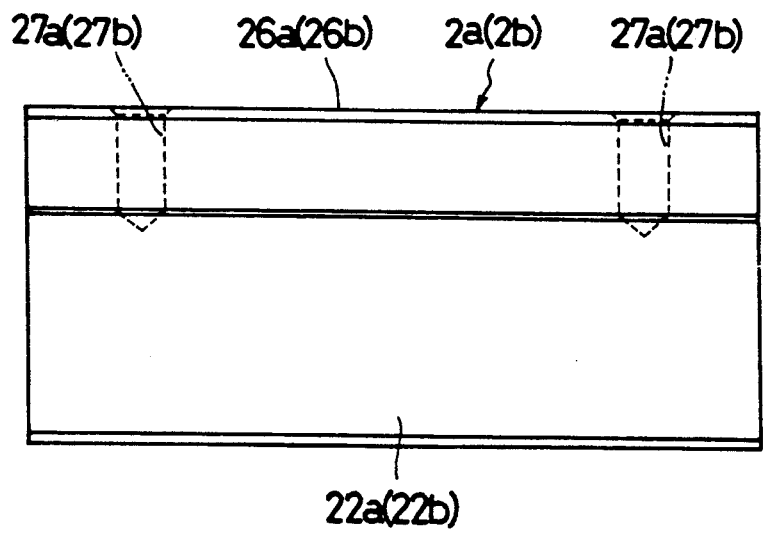

As shown in FIG. 1, the slide member is formed of end blocks 2a located at opposite ends thereof and two middle blocks 2b disposed therebetween. These blocks are connected by connecting bolts 51 through connecting plates 5. As shown in FIGS. 3 and 4, each of the blocks 2a and 2b has a base 21a (21b) and a pair of wings 22a (22b) extending downward therefrom to form an inverted C-shaped section, and is provided at an inner surface of each wing 22a (22b) with vertically spaced two grooves 23a (23b) extending in an axial direction. In each groove, there is formed a load rolling surface 24a (24b) having a curved section of a radius of curvature larger than a radius of a ball 4 which rolls thereon. Both the sleeves 22 are provided with no-load rolling apertures 25a (25b) which form parts of rolling member circulating means and respectively correspond to the load rolling surfaces 24a (24b). Upper surfaces of the base 21a (21b) form mounting surfaces 26a (26b) on which a movable member such as a table is mounted, and are provided with tapped bolt holes 27a (27b) engaging mounting bolts (not shown). In FIG. 3, numerals 28 and 29 indicate ball retainers, which are fixed to the bases 21a (21b) and the wings 22a (22b) by screws (not shown), respectively, and serve to prevent the balls 4 from dropping from the grooves 23a (23b) on the blocks 2 when the slide bed 2 is removed from the track member 1. Numerals 30a (30b) indicate bolt holes engaging the coupling bolts 51.

In this embodiment, continuity of the load rolling surfaces 24a and 24b of the blocks 2a and 2b coupled together is improved by simultaneously grinding the four blocks 2a and 2b to form the load rolling surface 24. That is; the four blocks 2a and 2b are coupled together when fixed to a machine tool, and are handled as one integral slide bed when the grinding is applied thereto.

Figure 5:
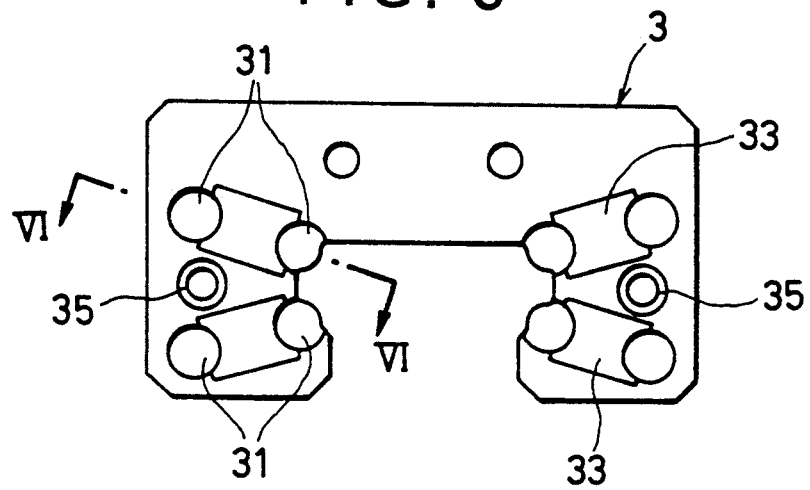
FIG. 5 is a rear view of a cover.
Figure 6:
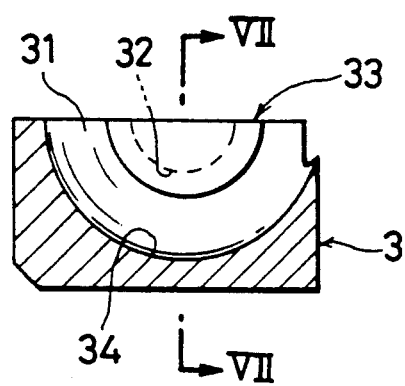
FIG. 6 is a cross section taken along line VI—VI in FIG. 5.
Figure 7:
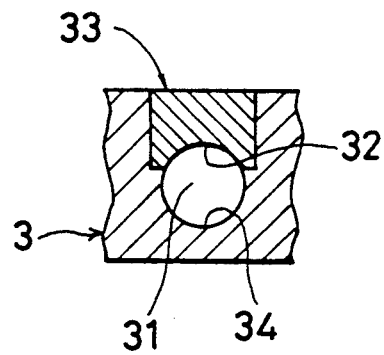
FIG. 7 is a cross section taken along line VII—VII in FIG. 6.
Figure 8:
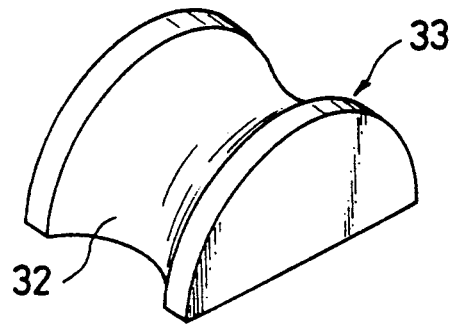
FIG. 8 is a perspective view illustrating a guide piece.

Crowning is applied to the load rolling surfaces 24a of the end blocks 2a after the grinding so that the balls 4 may be smoothly forced into the load region and released therefrom. On the other hand, the covers 3 are made from synthetic resin and are provided, as shown in FIGS. 5-7, at their inner sides with ball return paths 31 which connect the load rolling surfaces 24a formed on the end blocks 2a and the corresponding no-load rolling apertures 25a. These ball return paths 31 are formed by semicircular guide pieces 33 which have guide surfaces 32 continuing to the load rolling surfaces 24a and are fitted over ball guide grooves 34 formed in the covers 33. Numerals 35 indicate through holes through which fixing bolts (not shown) screwed into the end blocks 2 are inserted.

Figure 9:
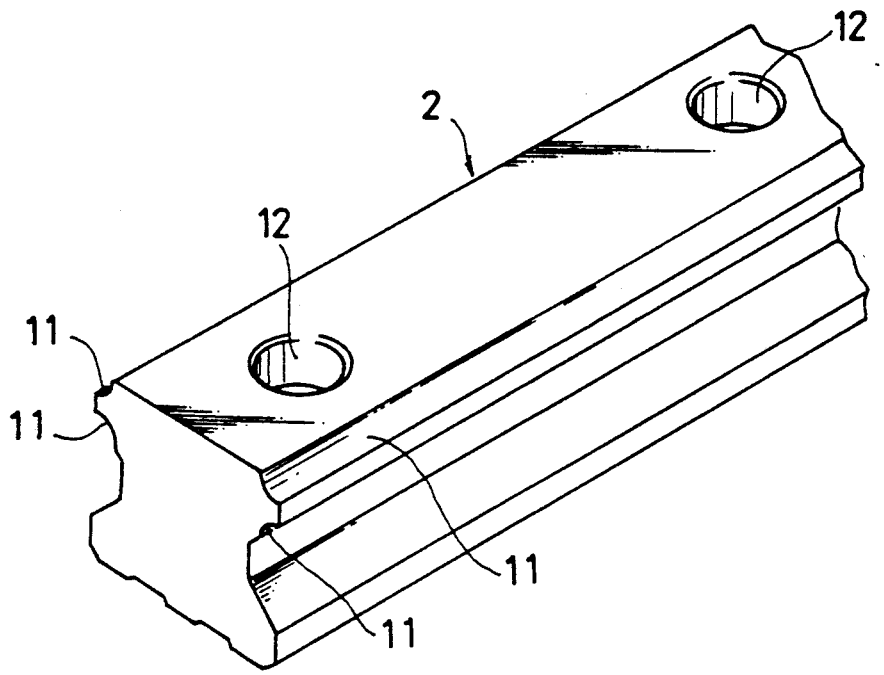
FIGS. 9 and 10 are a perspective view and a cross section illustrating a track members, respectively.
Figure 10:
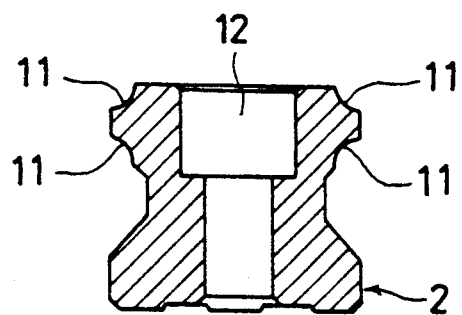

The track member 1 has a rectangular cross-sectional shape as shown in FIGS. 9 and 10 which has opposite sides recessed into trapezoids and also has recessed right and left shoulders. On inclined surfaces which are faced obliquely downward and formed by the above trapezoidal as well as inclined surfaces which are faced obliquely upward and formed by the recessed shoulders, there are provided rolling surfaces 11 which correspond to the load rolling surfaces 24a and 24b of the end blocks 2a and the middle blocks 2b, respectively. Numerals 12 indicate attaching holes through which fixing bolts (not shown) are inserted for engaging the fixing portion.

Figure 11:
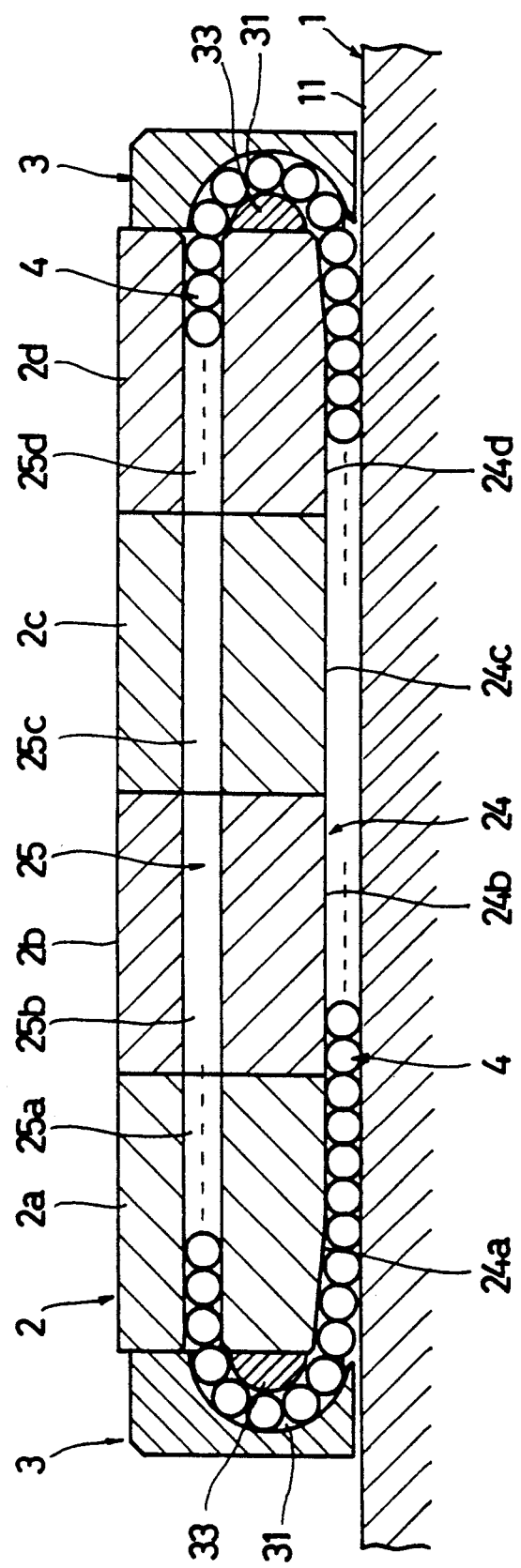
FIG. 11 is a cross section illustrating an endless ball circulation path in the slide member.

According to the bearing for the linear sliding motion of the invention thus constructed, as shown in FIG. 11, a pair of end blocks 2a and the two middle blocks 2b are coupled together to form the long load rolling surface 24 by the continuous load rolling surfaces 24a and 24b of the blocks 2a and 2b, and also the slide member 2 provided with the no-load rolling apertures 25 corresponding to the load rolling surfaces 24 are obtained therefrom. Further, by attaching the covers 3 to the end blocks 2a, the endless ball circulation paths which connect the load rolling surfaces 24 and the no-load rolling apertures 25 of the slide member 2 are formed, whereby the slide bed 2 shown in FIG. 1 is completed.

Figure 12:
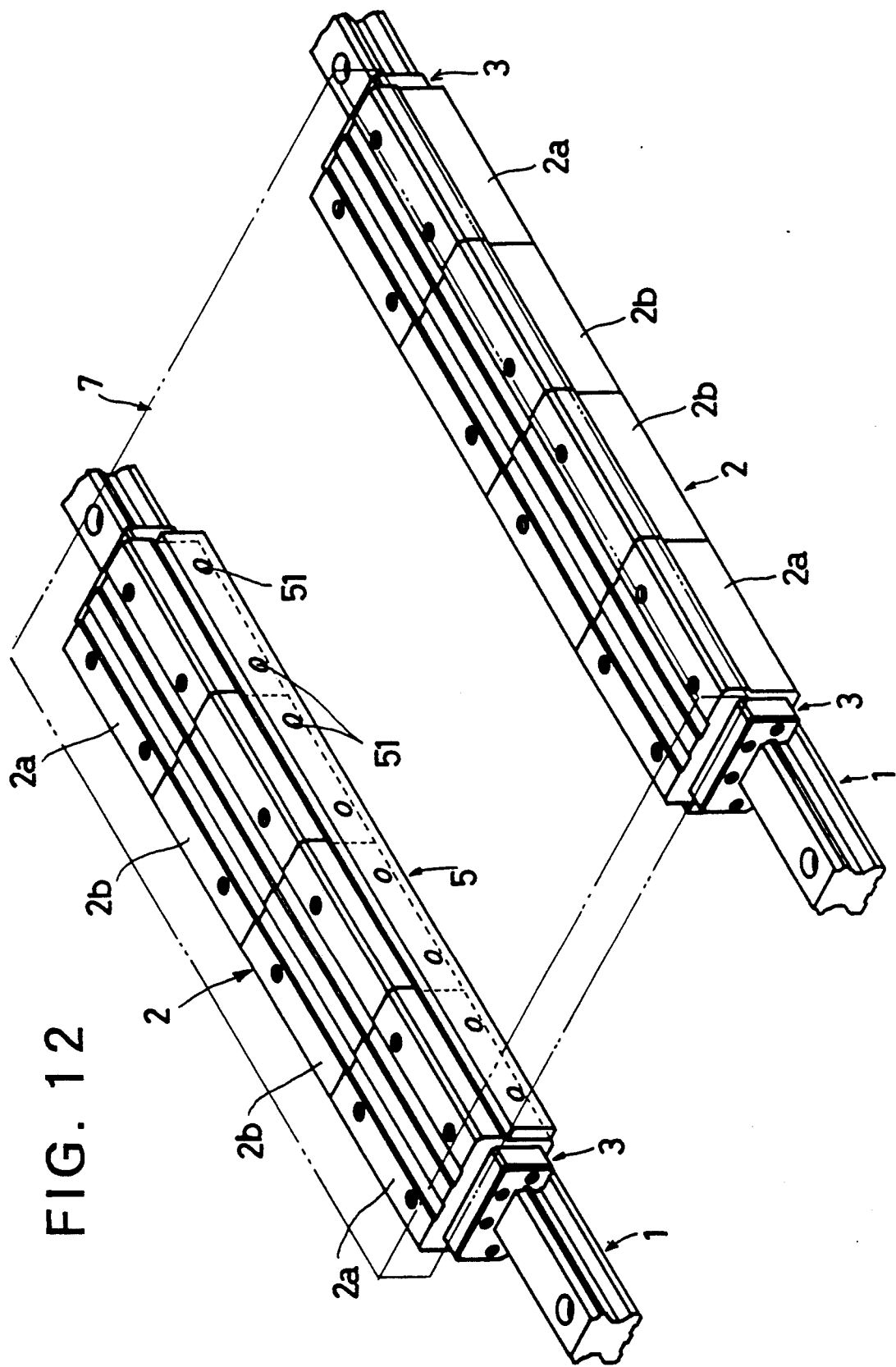
FIGS. 12, 13 and 14 are a perspective view, a top view and a front view illustrating a first embodiment of a table for linear sliding motion of the invention, respectively.

FIG. 12 shows a first embodiment of a table for the linear sliding motion including two sets of the bearing for the linear sliding motion of the embodiment described above. The track member 1 are disposed on the fixing portion with a predetermined space between one another, and a table 7 is fixed to the slide members 2.

With respect to the manufacturing of the table for the linear sliding motion shown in FIG. 12, since the number of the middle blocks 2b can be appropriately determined in the bearing for the linear sliding motion of the embodiment, the slide members 2 having lengths depending on the sizes of the area in which the slide members 2 are disposed can be facilely manufactured.

Accordingly, it is possible to increase the number of the load balls 4 rolling between the load rolling surfaces 24 of the slide members 2 and the rolling surfaces 11 of the track beds 1 in accordance with the sizes of the table 7, so that waving in the vertical and/or lateral directions, which may be caused by circulation of the balls 4, can be minimized, and the linearity of the movement can be increased.

Since the lengths of the slide members 2 are increased depending on the sizes of the table 7, a contact area between the slide members 2 and the table 7 can be increased, so that the rigidity of the table can be increased, as compared with the conventional bearing for the linear sliding motion shown in FIG. 20.

Figure 18:
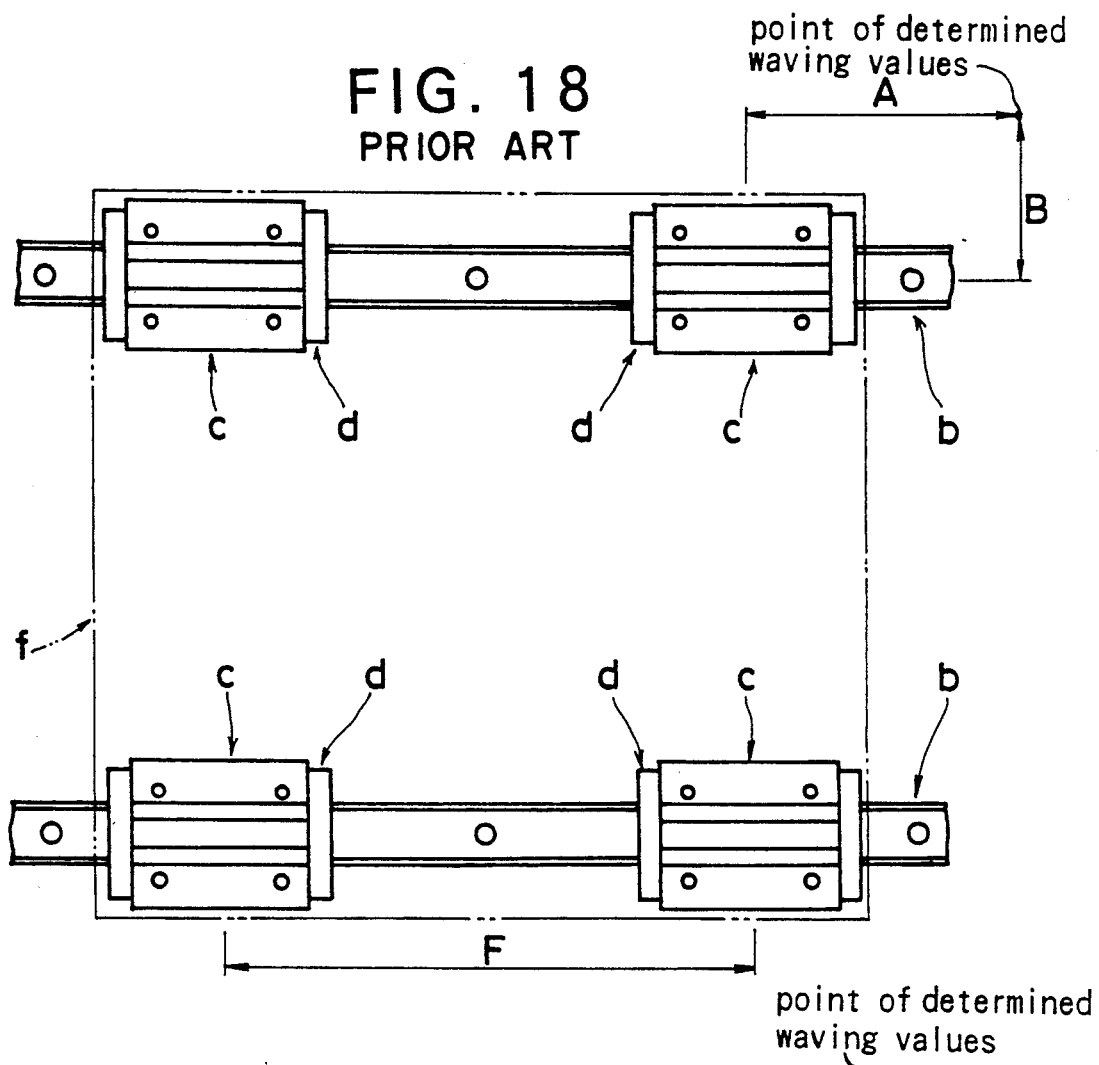
FIGS. 18 and 19 are a top view and a front view illustrating a table for the linear sliding motion in the prior art for comparison, respectively.
Figure 19:
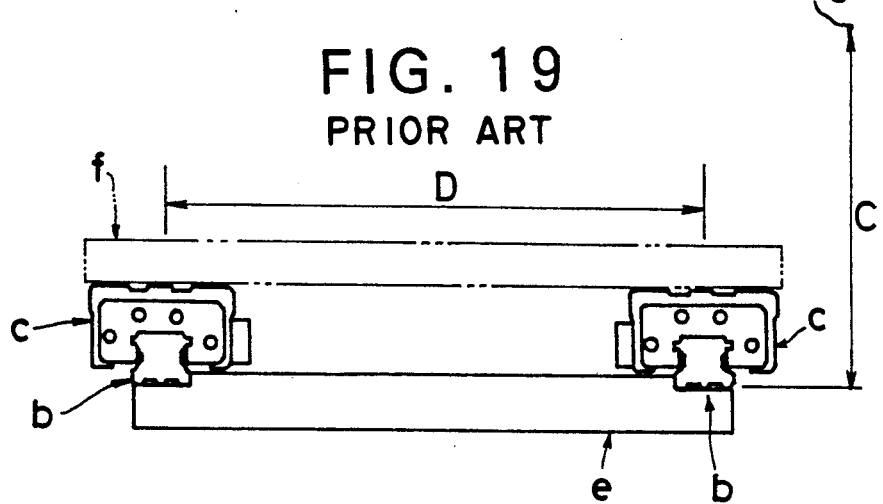

In order to confirm the effectiveness of the invention, the inventors of the application and others have actually determined waving values of the table for the linear sliding motion shown in FIG. 12. The measured results are as follows. For comparison, similar measurement has been made with respect to the table for the linear sliding motion employing the conventional bearing for the linear sliding motion shown in FIGS. 18 and 19 (this table will be called as a "comparison example"), and the result of this measurement also will be described below.

Figure 15:
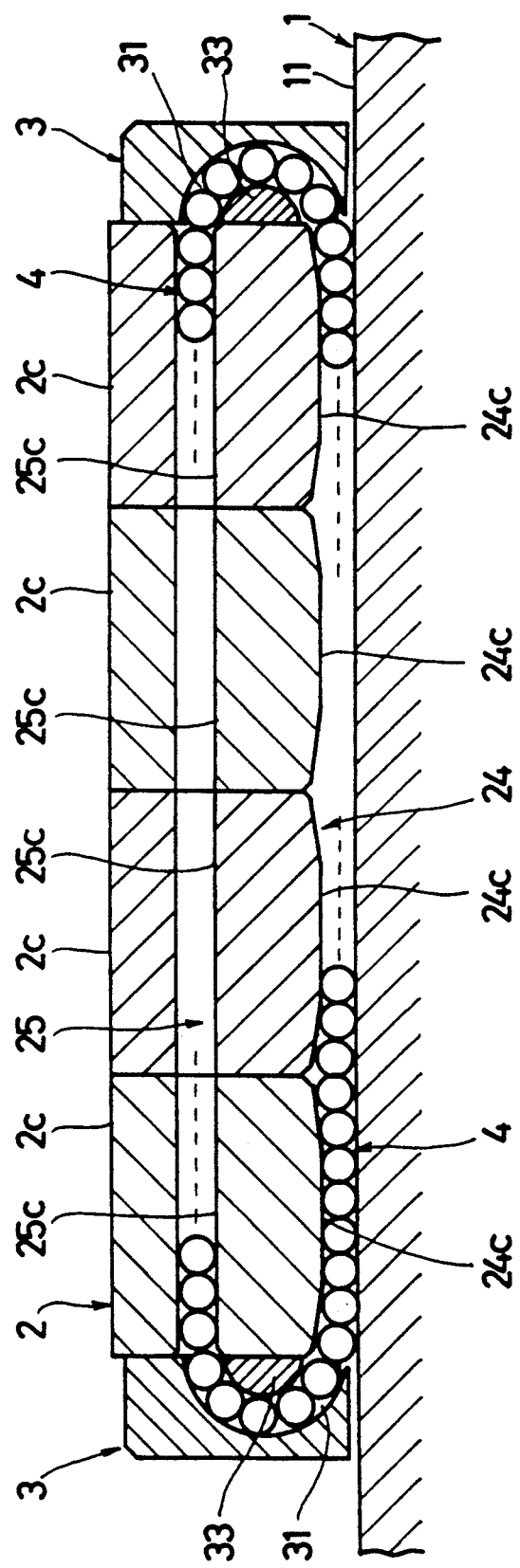
FIG. 15 is a cross section illustrating an endless ball circulation path for bearings for the linear sliding motion used in experiments.

The slide bed 2 used in the experiment is slightly different from that of the first embodiment in that the slide member 2 is formed of four conventional bearing blocks 2c coupled together. Therefore, as shown in FIG. 15, the crowning has been applied to the load rolling surface 24c of each block 2. However, other structures such as the load rolling apertures 25c are similar to those of the bearing of the first embodiment.

Figure 13:
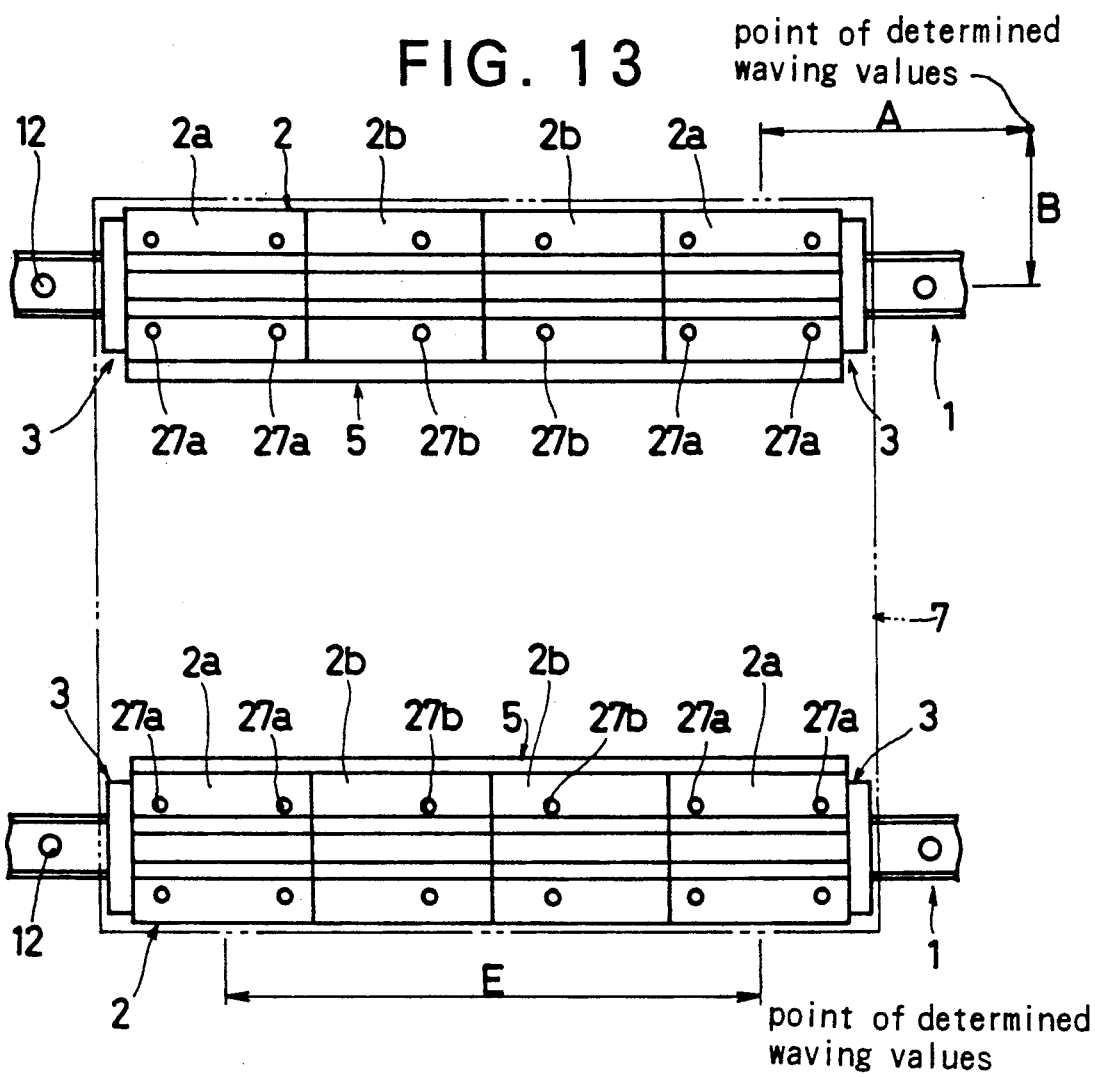
Figure 14:
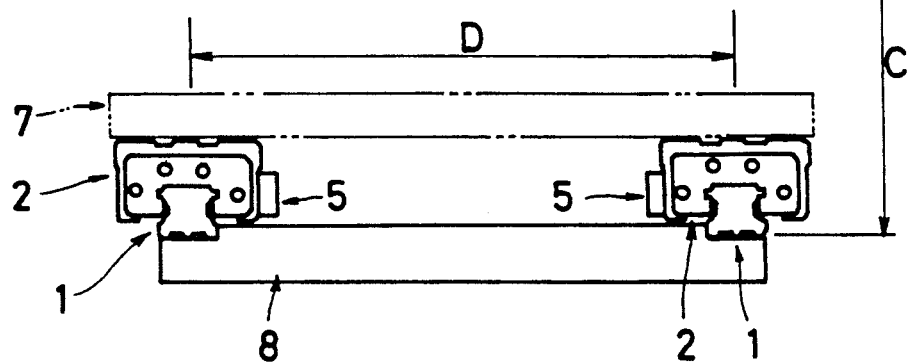

With respect to the table for the linear sliding motion of the invention, variation of the waving values which may be caused by the various coupling states between the blocks 2a and 2b and the table 7 were determined by measuring the waving values in a case (experiment (1)) in which only the attaching bolts for the bolt holes 27a in the end blocks 2a were fastened and in a case (experiment (2)) in which all the attaching bolts for the bolt holes 27a and 27b in the end blocks 2a and the middle blocks 2b were fastened (see FIG. 13).

The waving values were determined at points of distances and heights of A=97 mm, B=107 mm in FIGS. 13, 14, 18 and 19, and C=360 mm. Spaces between the track beds in the embodiment and the comparison example are equal to each other, i.e., D=315 mm. The slide bed of the embodiment has a length of E=341 mm, and the space between the slide members in the comparison example is 341 mm (F=341 mm).

The waving values obtained from the experiments are as follows.

Experiment ①
  vertical direction: 0.11 μm
  lateral direction: 0.09 μm
Experiment ②
  vertical direction: 0.095 μm
  lateral direction: 0.073 μm
Comparison Example
  vertical direction: 0.2~0.25 μm
  lateral direction: 0.2~0.25 μm As can be seen from the results described above, in the table for the linear sliding motion using the bearing for the linear sliding motion according to the invention has the waving values which are substantially half or less than those of the comparison example, and thus the effectiveness of the invention can be confirmed. Further, it has been found that the waving values are improved in the bearing for the linear sliding motion according to the invention, if all the blocks c are fixed to the table.

Figure 16:
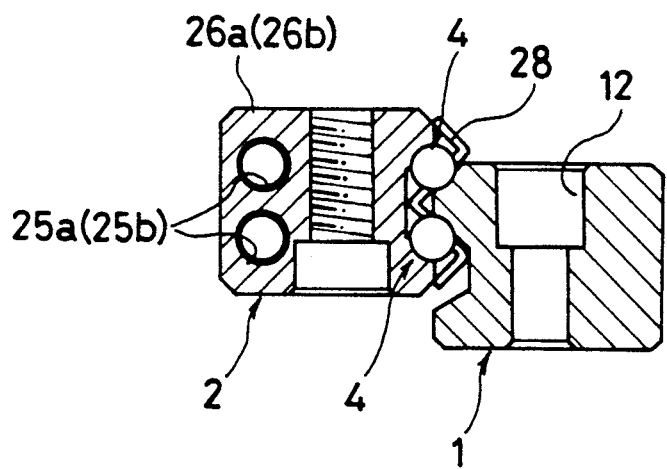
FIG. 16 is a cross section illustrating another embodiment of a bearing for the linear sliding motion of the invention.
Figure 17:
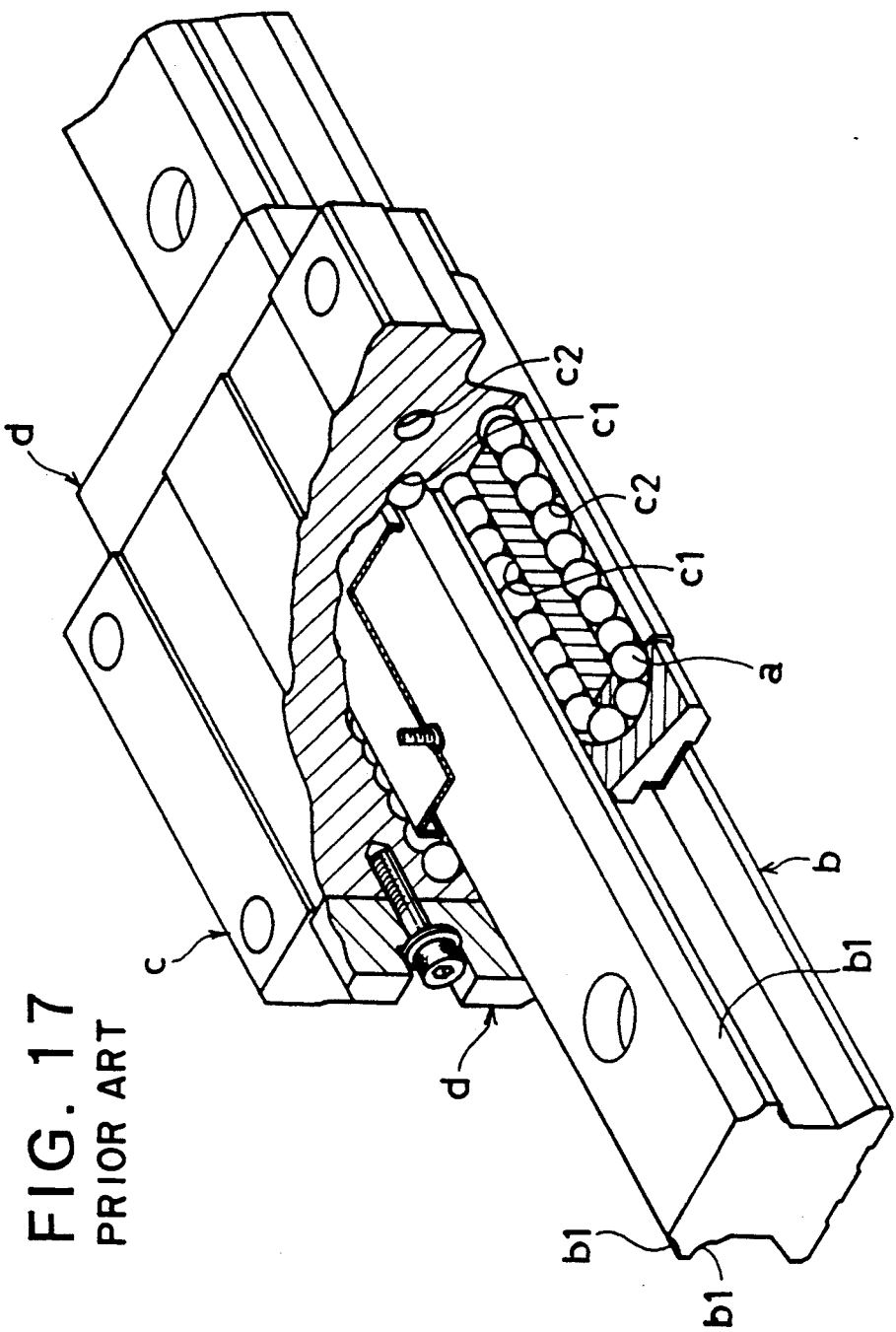
FIG. 17 is a perspective view illustrating a bearing for the linear sliding motion in the prior art.

The bearing for the linear sliding motion of the invention is not restricted to the first embodiment described-above, and, for example, it may have a sectional configuration as shown in FIG. 16. Structures in FIG. 16 are similar to those described above, except for the sectional configuration of the block 2a (2b), and thus the same reference numerals are allotted thereto without detailed description thereof.

INDUSTRIAL APPLICABILITY

According to the bearing for the linear sliding motion of the invention, as described hereinabove, the slide member can be constructed by coupling the divided blocks and thus the number of the load rolling members can be facilely increased in accordance with the sizes of the table to be linearly guided, so that the waving of the slide member can be minimized and the linearity of the movement can be increased.

According to the table for the linear sliding motion of the invention which employs these bearings, the movable member such as a machine tool mounted thereon can be smoothly and linearly guided with a high linearity, and thus works can be machined with a high accuracy.

Further, since the table can be supported by the slide members having the lengths corresponding to the sizes of the table, the table for the linear sliding motion can have a high rigidity, whereby the thickness can be reduced for achieving low cost.

What is claimed is:

1. A bearing for linear sliding motion, comprising:
   a track member provided with rolling surfaces for rolling members such as balls or rollers extending in a lengthwise direction;
   a slide member formed of a plurality of divided blocks which are provided with load rolling surfaces which in cooperation with said rolling surfaces and said rolling members supported therebetween, serve to transfer a load between said slide member and said track member, said divided blocks being jointed together to continuously connect said load rolling surfaces; and
   rolling member circulating means for connecting opposing ends of said continuously connected load rolling surfaces to form an endless circulation path for said rolling members.

2. A bearing as claimed in claim 1 wherein said slide member is formed of a pair of end blocks having load rolling surfaces to which crowning is applied, and at least one middle block disposed between said end blocks.

3. A table for linear sliding motion, comprising: a track member provided with rolling surfaces for rolling members such as balls or rollers extending in a lengthwise direction;
   a slide member formed of a plurality of divided blocks which are provided with load rolling surfaces which, in cooperation with said rolling surfaces and said rolling members supported therebetween, serve to transfer a load between said slide member and said track member, said divided blocks being jointed together to continuously connect said load rolling surfaces;
   rolling member circulating means for connecting opposing ends of said continuously connected load rolling surfaces to form an endless circulation path for said rolling members; and
   a table for supporting a movable member to be guided linearly, said table being fixed to said slide member for movement in a lengthwise direction of said track member.

* * * * *